(12) United States Patent
Lycke et al.

(10) Patent No.: US 12,544,343 B2
(45) Date of Patent: Feb. 10, 2026

(54) TREATMENT OF INFLAMMATORY CONDITION IN MUCOUS MEMBRANE OR SKIN

(71) Applicant: MUCOCORT AB, Umeå (SE)

(72) Inventors: Jean Lycke, Mölnlycke (SE); Thomas Hedner, Vaxholm (SE); Mats Jontell, Borås (SE); Olof Isaksson, Gothenburg (SE)

(73) Assignee: Mucocort AB, Umeå (SE)

( * ) Notice: Subject to any disclaimer, the term of this patent is extended or adjusted under 35 U.S.C. 154(b) by 903 days.

(21) Appl. No.: 17/771,122

(22) PCT Filed: Oct. 23, 2020

(86) PCT No.: PCT/SE2020/051027
§ 371 (c)(1),
(2) Date: Apr. 22, 2022

(87) PCT Pub. No.: WO2021/080500
PCT Pub. Date: Apr. 29, 2021

(65) Prior Publication Data
US 2022/0362166 A1  Nov. 17, 2022

(30) Foreign Application Priority Data
Oct. 25, 2019 (SE) .................................. 1951224-3

(51) Int. Cl.
| A61K 31/4709 | (2006.01) |
| A61K 9/00 | (2006.01) |
| A61K 9/06 | (2006.01) |
| A61K 31/047 | (2006.01) |
| A61K 47/10 | (2017.01) |
| A61K 47/12 | (2006.01) |
| A61K 47/32 | (2006.01) |
| A61P 17/00 | (2006.01) |
| A61P 17/04 | (2006.01) |
| A61P 17/10 | (2006.01) |
| A61P 29/00 | (2006.01) |
| A61P 31/04 | (2006.01) |

(52) U.S. Cl.
CPC .......... *A61K 31/047* (2013.01); *A61K 9/0014* (2013.01); *A61K 9/006* (2013.01); *A61K 47/32* (2013.01); *A61P 29/00* (2018.01)

(58) Field of Classification Search
CPC .... A61K 31/048; A61K 9/0014; A61K 9/006; A61K 47/32; A61P 29/00
See application file for complete search history.

(56) References Cited

U.S. PATENT DOCUMENTS

| 8,513,225 | B2 * | 8/2013 | Chiou ................ A61K 9/0043 514/159 |
| 2002/0103219 | A1 * | 8/2002 | Jacob ................... A61K 9/006 424/487 |
| 2011/0183011 | A1 | 7/2011 | Chiou |

FOREIGN PATENT DOCUMENTS

| CN | 107582691 A | 1/2018 |
| KR | 20060087745 A | 8/2006 |

OTHER PUBLICATIONS

"International Search Report and Written Opinion corresponding to International Application No. PCT/SE2020/051027 mailed Jan. 25, 2021".

* cited by examiner

*Primary Examiner* — Layla Soroush
(74) *Attorney, Agent, or Firm* — Myers Bigel, P.A.

(57) ABSTRACT

The invention relates a pharmaceutical composition comprising from 0.001 to 2% (w/v) of propane-1,2-diol as the only anti-inflammatory agent and at least one bioadhesive polymer. The pharmaceutical composition can be used in amelioration, prevention or treatment of an inflammatory condition in a mucous membrane or skin of a subject, and/or in treatment of pain associated with such an 5 inflammatory condition.

6 Claims, 11 Drawing Sheets

TREATMENT OF INFLAMMATORY CONDITION IN MUCOUS MEMBRANE OR SKIN

STATEMENT OF PRIORITY

This application is a 35 U.S.C. § 371 national phase application of PCT Application No. PCT/SE2020/051027 filed Oct. 23, 2020, which claims priority to Swedish Application No. 1951224-3 filed Oct. 25, 2019, the entire contents of each of which are incorporated by reference herein.

TECHNICAL FIELD

The present invention relates to pharmaceutical compositions used to ameliorate, prevent or treat inflammatory conditions in a mucous membrane or skin of a subject, and treatment of pain associated with such an inflammatory condition.

BACKGROUND

Wound healing is a complex process occurring in a series of overlapping processes; an inflammatory reaction, a proliferative process leading to tissue restoration and, eventually, tissue remodeling. Wound healing processes are highly influenced and regulated by a variety of cellular elements capable of bioactive compounds, such as growth factors and cytokines at the wound site.

The initial inflammatory phase of the wound healing process involves vascular responses characterized by blood coagulation and hemostasis as well as cellular events, including infiltration of leukocytes and inflammatory cells with varied functions including release of antimicrobial factors and cytokines, which initiate the proliferative response for wound repair. Some authors include additional stages, with the first stage being hemostasis, highlighting the importance of vascular responses. During the proliferative phase, there is formation of the epithelium to cover the wound surface and there is a concomitant growth of granulation tissue to fill the wound space. The granulation tissue involves proliferation of fibroblasts, deposition of collagens and other extracellular matrices, and initiation of a development of new blood vessels. Once the new tissue elements are generated within the wound, the remodeling phase begins, which aims to restore tissue structural integrity and functional capacity. The different phases of the typical wound repair are usually not simple linear events but rather complex and overlapping in time.

When the cellular elements appear in the wound site, they become activated and macrophages start to release a number of growth factors and cytokines, which influence granulation and tissue formation.

The development of new and effective interventions in wound care remains an area of intense research. The roles of various inflammatory cells, vasoactive amines, serotonin, the clotting factors, arachidonic acid metabolites, free radicals, platelet factors, cytokines, chemokines, and gene regulation are extensively studied, in terms of effects related the inflammatory process. Despite the many scientific discoveries and advances, the understanding of the mechanisms and pathways involved in normal and abnormal wound healing remain limited. Thus, there is significant room for improvements of management of specific inflammatory conditions.

U.S. Pat. No. 8,513,225 discloses a hydrogel comprising 80% propylene glycol that is applied to a prodermal lesion of a patient suffering from recurrent canker sores. The pain subsided but the lesion did not go way.

SUMMARY

It is a general objective to provide a treatment of inflammatory conditions in a mucous membrane or skin.

This and other objectives are met by embodiments as disclosed herein.

The present invention is defined in the independent claims. Further embodiments of the invention are defined in the dependent claims.

Briefly, the invention relates to a pharmaceutical composition for use in amelioration, prevention or treatment of an inflammatory condition in a mucous membrane or skin of a subject, and/or for use in treatment of pain associated with such an inflammatory condition in a mucous membrane or skin of a subject. The pharmaceutical composition comprises from 0.001 to 2% (w/v) of propane-1,2-diol and at least one bioadhesive polymer. The pharmaceutical composition lacks any anti-inflammatory agent besides propane-1,2-diol.

The pharmaceutical composition of the invention is capable of significantly reducing the amount of tumor necrosis factor alpha (TNF-α) and interleukin 2 (IL-2), two cytokines involved in inflammatory processes. The invention is shown to treat inflammatory conditions and to reduce the pain and discomfort associated with such inflammatory conditions and lesions.

DETAILED DESCRIPTION

Figure 1A:
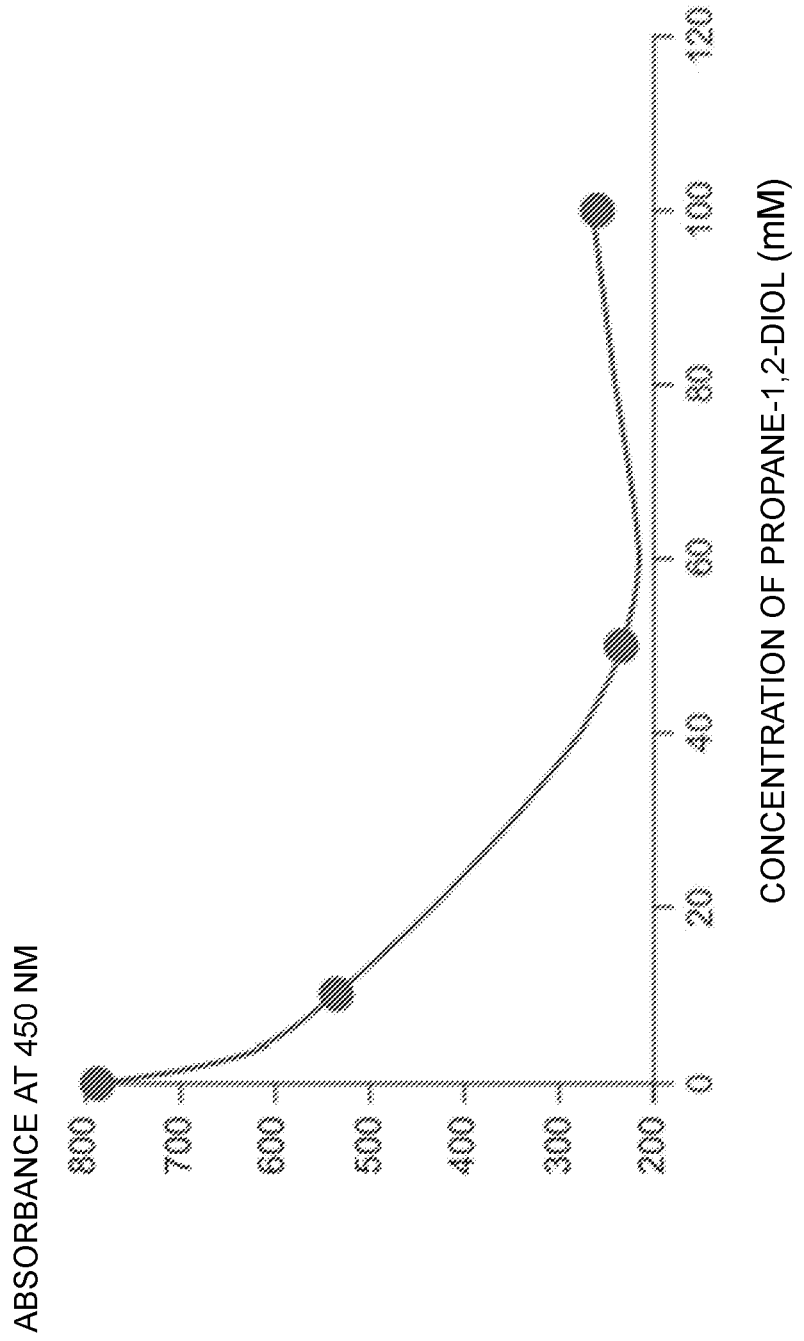
FIGS. 1A to 1D show concentration-dependent effect of propane-1,2-diol, i.e., propylene glycol (PG), on the TNF-α production by peripheral blood mononuclear cells (PBMC) from 4 patients stimulated with lipopolysaccharide (LPS). A strong inhibition of the concentration of TNF-α was obtained at 100 mM propane-1,2-diol.
Figure 1B:
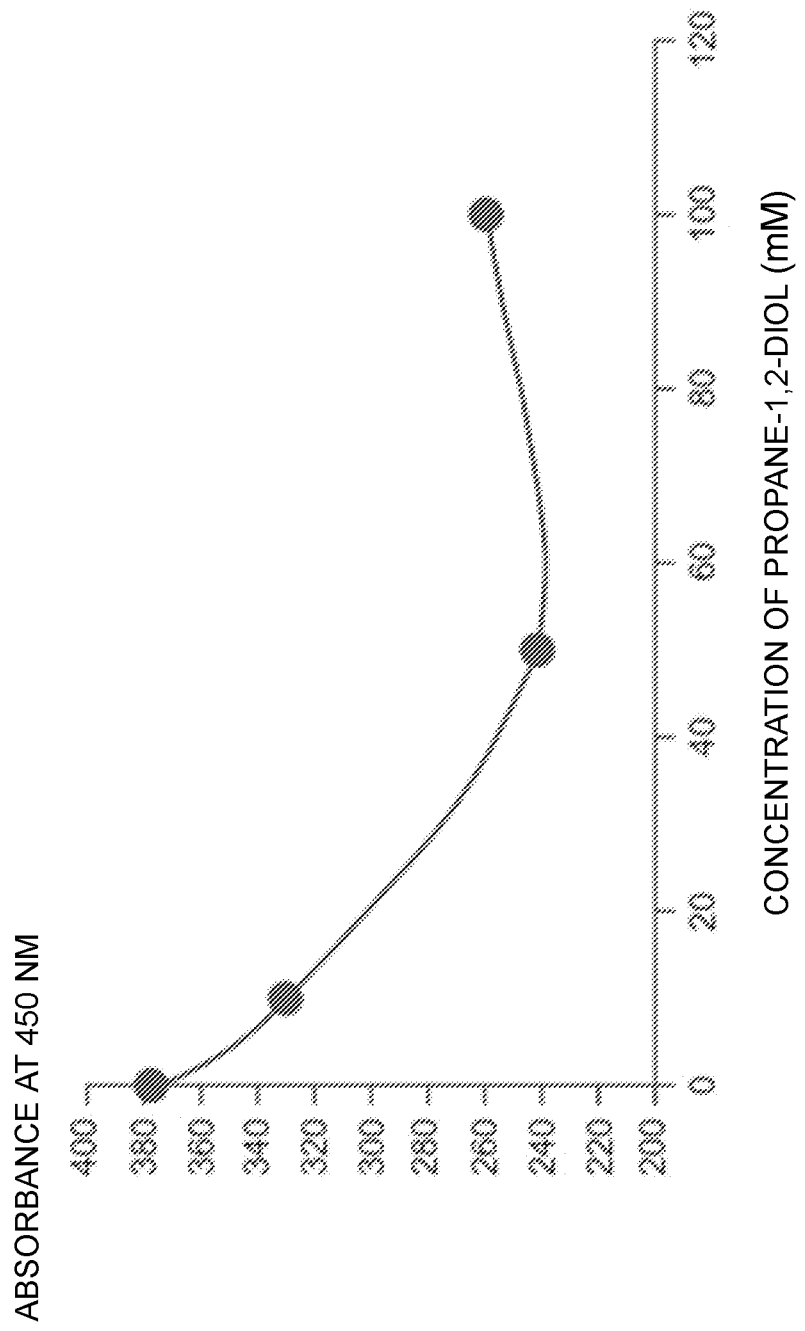
Figure 1C:
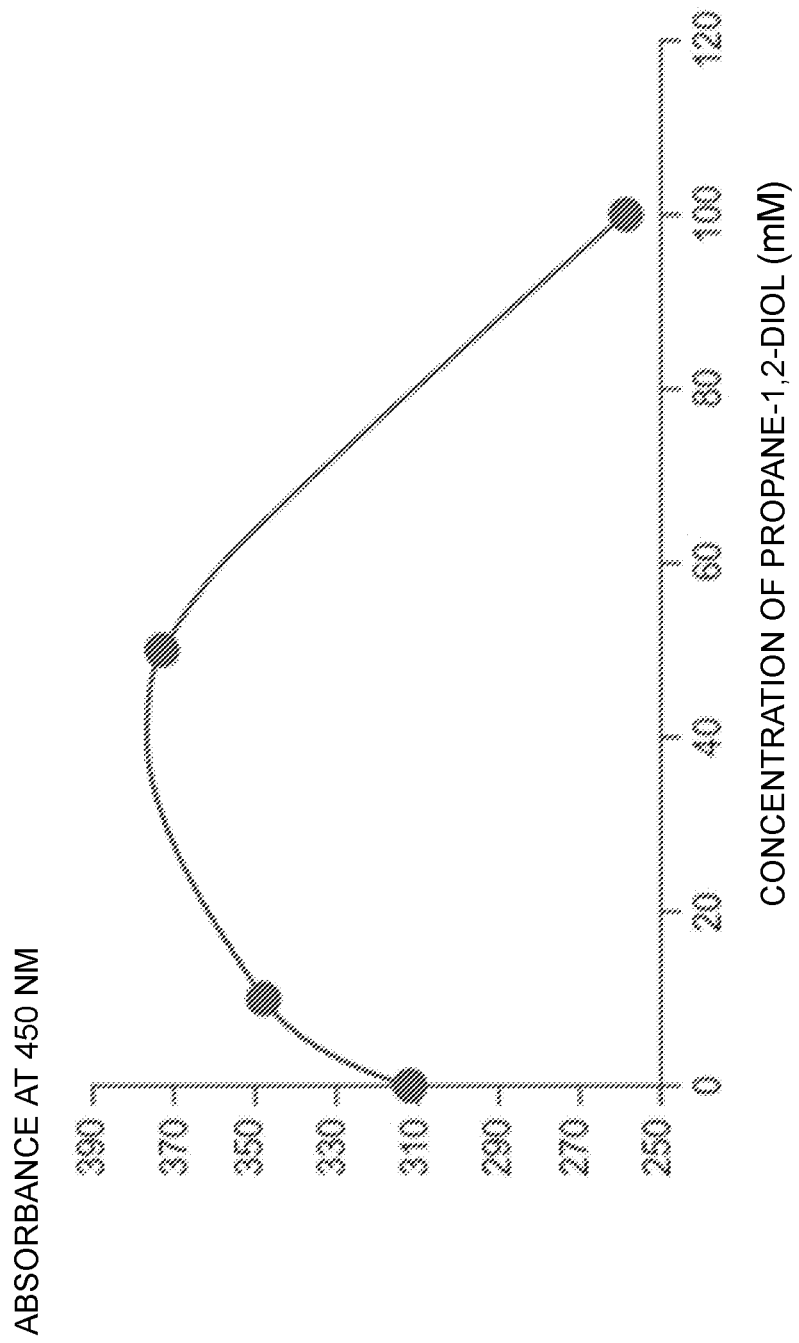
Figure 1D:
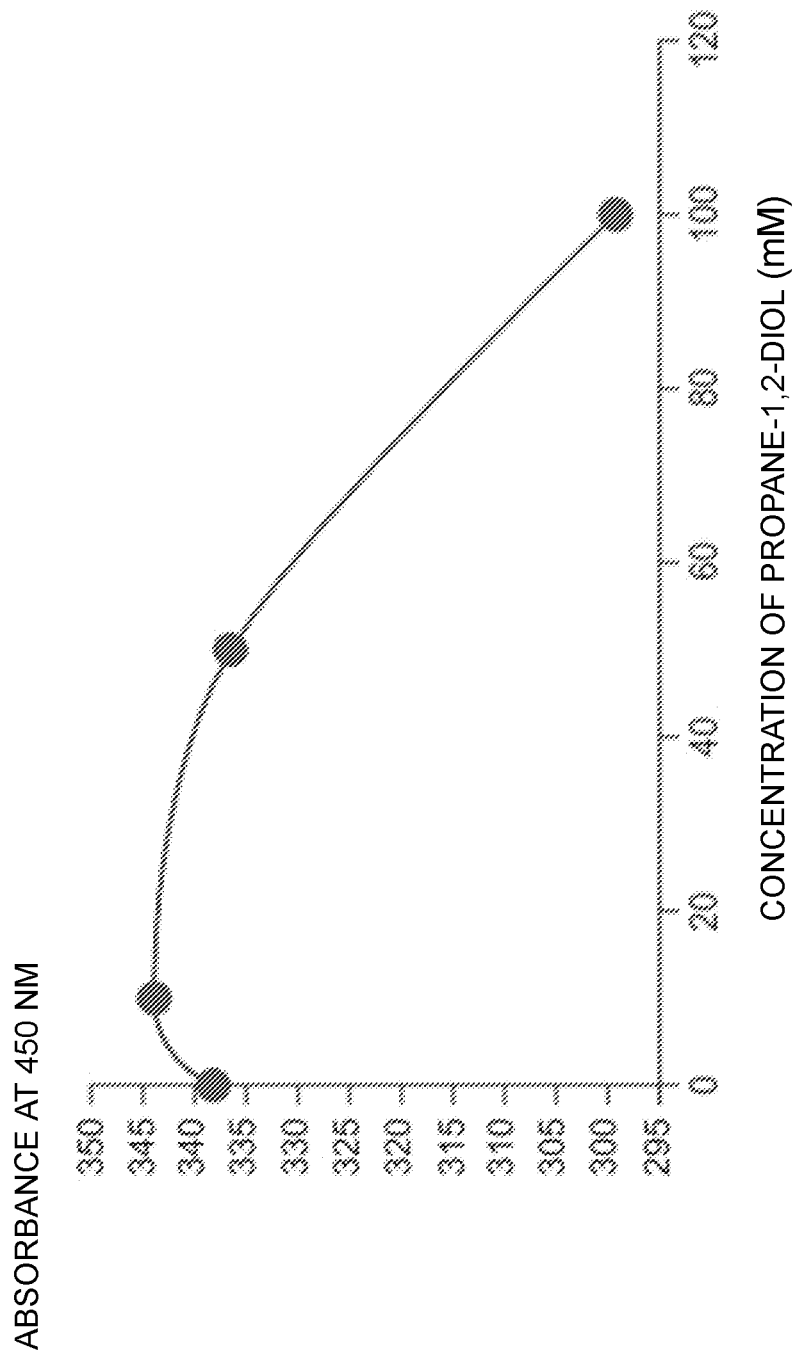

The present invention relates to pharmaceutical compositions used to ameliorate, prevent or treat inflammatory conditions in a mucous membrane or skin of a subject, and treatment of pain associated with such an inflammatory condition.

It has surprisingly been found that propane-1,2-diol is useful in ameliorating, preventing and/or treating inflammatory conditions in mucous membranes and the skin of a subject.

Propane-1,2-diol, commonly referred to as propylene glycol (PG), is a synthetic diol alcohol with the chemical formula $C_3H_8O_2$. The compound is sometimes called α-propylene glycol to distinguish it from the isomer propane-1,3-diol, known as 3-propylene glycol. Other alternative names include 1,2-propanediol, 1,2-dihydroxypropane, methyl ethyl glycol (MEG), and methylethylene glycol.

Propane-1,2-diol is a tasteless, odorless, and colorless clear liquid that is hygroscopic and miscible with water, acetone, and chloroform. Propane-1,2-diol has many uses including, for instance, the production of polymers. It may also be used in food processing, and as a process fluid in low-temperature heat-exchange applications. Propane-1,2-diol is known for use in cosmetic and pharmaceutical compositions, as a solvent, co-solvent, humectant, plasticizer in polymer films, and as a permeation enhancer.

For a long time propane-1,2-diol has been considered as an inactive organic solvent (Seidenfeld and Hanzlik (1932) *J. Pharmac. Exp. Ther.* 44, 109-121; Braun and Cartland (1936) *J. Am. Pharm. Ass.* 25, 746-749; Weatherby and Haag (1938) *J. Am. Pharm. Assoc.* 27, 466-471). However, adverse effects of propane-1,2-diol have occurred following topical, oral, and intravenous administration (Glascow, et al. (1983) *Pediatrics* 72(3), 353-355). The adverse effects associated with propane-1,2-diol include central nervous system (CNS) toxicity, hyperosmolarity, hemolysis, cardiac arrhythmia, and lactic acidosis. Despite these adverse effects, high concentrations (15-100%) have been advocated as to be used for topical administration on various skin lesions in order to kill bacteria, fungi, and/or virus (U.S. Pat. No. 8,513,225). However, low concentrations of propane-1,2-diol have never been shown to have any detrimental effects on living organisms.

Experimental data as presented herein show that even low concentrations of propane-1,2-diol has therapeutic effect on inflammatory conditions of mucous membranes or the skin, and in particular by causing a significant reduction in tumor necrosis factor alpha (TNF-α) and interleukin-2 (IL-2).

TNF-α, also referred to as cachexin or cachectin, is a cytokine involved in systemic inflammation in mammalian tissues. TNF-α has a primary role in the regulation of cellular components of the immune system. TNF-α is known as a major pro-inflammatory mediator, and the overexpression of TNF-α, together with the resulting hyperactivation of nuclear factor kappa-light-chain-enhancer of activated B cells (NF-κB), is thought to be an important element in the development and maintenance of a variety of inflammatory conditions. TNF-α may act to induce fever, apoptotic cell death, cachexia, inflammation and respond to sepsis via cells producing IL-1 and IL-6.

TNF-α is known to be produced primarily by a range of cell types, such as macrophages (Olszewski et al. (2007) *Journal of Immunology* 178, 5701-5709), lymphoid cells, endothelial cells, cardiac myocytes, adipose tissue cells, and fibroblasts. In response to lipopolysaccharide (LPS), other bacterial products, and IL-1, large amounts of TNF-α are released. In the skin, mast cells are the primary source of TNF-α, which may be released upon inflammatory stimulus, e.g., LPS (Walsh et al. (1991) *Proc. Natl. Acad. Sci. U.S.A.* 88(10), 4220-4224).

TNF-α is primarily produced as a 233-amino acid-long type II transmembrane protein arranged in stable homotrimers and is released via proteolytic cleavage by the metalloprotease TNF-α converting enzyme (TACE), also called ADAM17. Both the secreted and the membrane bound forms are biologically active (Palladino et al. (2003) *Nature Reviews Drug Discovery* 2(9), 736-746). TNF-α can bind two receptors; TNF receptor type 1 (TNFR1), also referred to as CD120a or p55/60, and TNFR2, also referred to as CD120b or p75/80. TNFR1 is expressed in most tissues and can be fully activated by both the membrane-bound and soluble trimeric forms of TNF-α, whereas TNFR2 is found typically in cells of the immune system and responds to the membrane-bound form of the TNF-α homotrimer.

Upon contact with the ligand, TNF receptor binding may result in (1) activation of NF-κB; (2) activation of the mitogen-activated protein kinas (MAPK) pathways; or (3) induction of death signaling. TNF-α activation may therefore result in in complex and often conflicting effects mediated by these pathways in various tissues.

Figure 6:
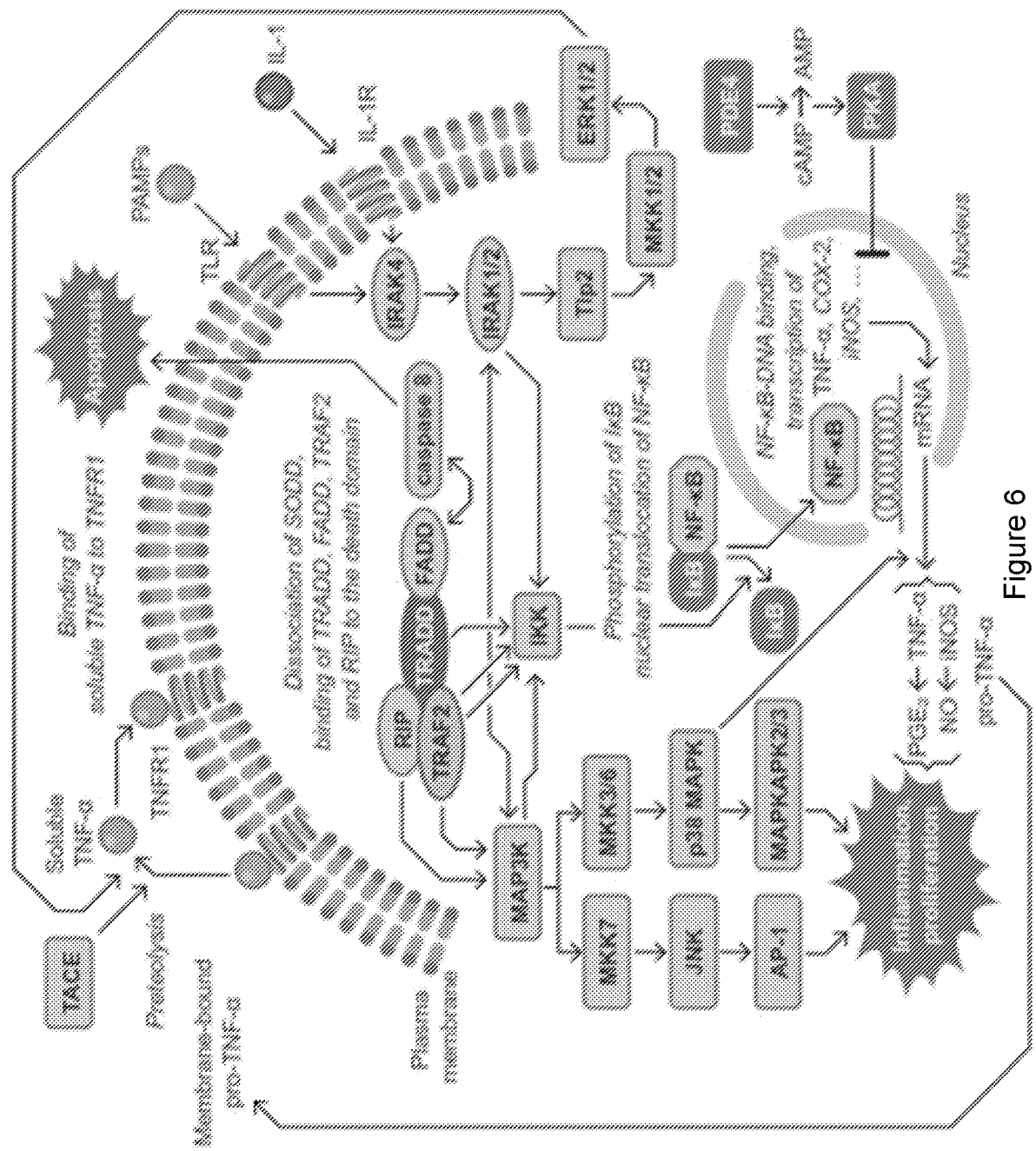
FIG. 6 shows the TNFR1 signaling pathway.

FIG. 6 shows the TNFR1 signaling pathway. TNF-α binding to TNFR1 results in the recruitment of TNF receptor-associated factor 2 (TRAF2), receptor interacting protein (RIP), and Fas-associated protein with death domain (FADD) to TNFR1 through the adaptor protein TRADD. TRAF2 and RIP lead to the activation of transcription factor activator protein 1 (AP-1) through the activation of mitogen activated protein (MAP) kinase kinase kinase (MAP3K) and of c-Jun N-terminal kinase (JNK) and p38 MAPK. TRAF2 and RIP also activate the transcription factor NF-kB through the activation of the kinase IκB kinase (IKK). The phosphorylation of IkB leads to the proteasomal degradation of the latter and to the nuclear translocation of activated NF-kB. Many of the genes transcribed by NF-kB and by AP-1 are anti-apoptotic or carcinogenic. FADD recruits and activates the pro-apoptotic caspase 8. TNF-α signaling and expression can be inhibited by targeting the proteolysis of pro-TNF-α to TNF-α or by interfering with the downstream MAP3K and NF-kB cascades. TNF-α expression can also be inhibited by compounds that target molecules along the IRAK4 signaling pathway, activate adenylate cyclase, or prevent the translation of pro-TNF-α messenger ribonucleic acid (mRNA) to pro-TNF-α. The expression of TNF-α can also be inhibited by compounds that interfere with the phosphodiesterase PDE4, which converts cyclic adenosine monophosphate (cAMP) to adenosine monophosphate (AMP), as phosphodiesterase 4 (PDE4) is required for the transcription of TNF-α by NF-kB. The drawing in FIG. 6 is adapted from Folmer et al. (2012) *Current Topics in Medicinal Chemistry* 12, 1392-1407.

Clearly, the complicated signaling following TNF-α release will ensure that, whenever this cytokine is released, a number of diverse cells with vastly diverse functions and conditions may give rise to an inflammatory response, which may be present or under development in mucous membranes or in the skin in a variety of anatomical locations. TNF-α related conditions include, for instance, several diseases involving the skin, such as psoriasis and atopic dermatitis, as well as diseases of the mucosa, such as recurrent aphthous stomatitis (RAS), inflammatory bowel disease (IBD) and oral lichen planus (Mozaffari et al. (2017) *Oral Surg Oral Med Oral Pathol Oral Radiol.* 124(3), e183-e189). TNF-α has been suggested as a key cytokine in such conditions.

In particular, TNF-α is believed to play an important role in the development of new RAS lesions, also referred to as aphthous stomatitis or canker sores, and has been found to be increased 2- to 5-fold in the saliva of affected patients (Chaudhuri et al. (2018) *J Dent Res Dent Clin Dent Prospect* 12(1), 45-48). The association of TNF-α in the development of RAS gains credence due to the fact that immunomodulatory drugs, such as thalidomide and pentoxifylline, have been found effective in the treatment of RAS (Natah et al. (2000) *Int J Oral Maxillofac Surg* 29, 375-80; Sampaio et al. (1991) *J Exp Med;* 173, 699-703).

IL-2 is a cytokine and one of the most important signaling molecules in the immune system. IL-2 is secreted by naive T cells that have just been activated by an antigen and which are to undergo clonal expansion. IL-2 is an autocrine messenger that is secreted by the same cells it acts on. IL-2 stimulates the T cells to mitosis and the amount of specific T cells increases to eliminate the pathogen. IL-2 is also a potent activating signal for natural killer (NK) cells and B cells. In addition, IL-2 stimulates regulatory T cells to turn off the immune response when the stimulus, such as the infection, is eliminated.

IL-2 is a member of a cytokine family, each member of which has a four alpha helix bundle; the family also includes IL-4, IL-7, IL-9, IL-15 and IL-21. IL-2 signals through the IL-2 receptor, a complex consisting of three chains, termed alpha (CD25), beta (CD122) and gamma (CD132). All cytokine family members share the gamma chain.

The pleiotropic effects of IL-2 are enabled due to the fact that IL-2 signals can be transduced via three different signaling pathways; the Janus kinase—signal transducer and activator of transcription protein (JAK-STAT), phosphoinositide 3-kinases/protein kinase B/mammalian target of rapamycin (PI3K/Akt/mTOR) and MAPK/extracellular signal-regulated kinase (MAPK/ERK) pathways. After IL-2 binding to its receptor, the cytoplasmatic domains of CD122 and CD132 heterodimerize causing activation of Janus kinases JAK1 and JAK3, which subsequently phosphorylate Tyr-338 on CD122. This phosphorylation recruits STAT transcription factors, predominantly STAT5, which dimerize and migrate to the cell nucleus where they bind to deoxyribonucleic acid (DNA).

IL-2 has essential roles in key functions of the immune system, tolerance and immunity, primarily via its direct effects on T cells. In the thymus, where T cells mature, it prevents autoimmune diseases by promoting the differentiation of certain immature T cells into regulatory T cells, which suppress other T cells that are otherwise primed to attack normal healthy cells in the body. IL-2 enhances activation-induced cell death (AICD). IL-2 also promotes the differentiation of T cells into effector T cells and into memory T cells, when the initial T cell is also stimulated by an antigen, thus helping the body fight off infections. Together with other polarizing cytokines, IL-2 stimulates naive CD4+ T cell differentiation into Th1 and Th2 lymphocytes while it impedes differentiation into Th17 and follicular Th lymphocytes.

IL-2 expression and secretion are tightly regulated and function as part of both transient positive and negative feedback loops in mounting and dampening immune responses. Through its role in the development of T cell immunologic memory, which depends upon the expansion of the number and function of antigen-selected T cell clones, it plays a key role in maintaining cell-mediated immunity.

Clearly, the complicated signaling following IL-2 release will ensure that, whenever this cytokine is released, a number of diverse cells with vastly diverse functions and conditions may give rise to an inflammatory response which may be present or under development in mucous membranes or in the skin in a variety of anatomical locations.

IL-2 related conditions include several diseases involving the skin, such as psoriasis and atopic dermatitis, as well as diseases of the mucosa, such as e.g. RAS, IBD and oral lichen planus. For a review, see Vasovic, et al. (2016) *Cent Eur J Immunol.* 41(3), 302-310. IL-2 has been suggested as a key cytokine in such conditions. IL-2 is also believed to play an important role in the development of new RAS lesions (Kalpana et al. (2014) *J Oral Maxillofac Pathol.* 18(3), 361-364; Bhosale et al. (2018) *J Contemp Dent Pract.* 19(10), 1242-1245). IL-2 further also believed to be involved in the development of IBD (Ebrahimpour, (2017) *J Biol Regul Homeost Agents.* 31(2), 279-287) as well as oral lichen planus (Qian et al. (2018) *Med Sci Monit.* 24: 8716-8721).

Propane-1,2-diol of the present invention is capable of significantly reducing the amount of TNF-α and IL-2 even when administered in low amounts. Accordingly, propapane-1,2-diol can be used to ameliorate, prevent or treat inflammatory conditions in the mucous membrane or the skin by, for instance, inducing a reduction in TNF-α and/or IL-2.

An aspect of the invention relates to a pharmaceutical composition for use in amelioration, prevention or treatment of an inflammatory condition in a mucous membrane or skin of a subject. The pharmaceutical composition comprises from 0.001 to 2% (w/v) of propane-1,2-diol and at least one bioadhesive polymer. The pharmaceutical composition lacks any anti-inflammatory agent besides propane-1,2-diol.

The pharmaceutical composition of the invention thereby comprises a comparatively low amount of propane-1,2-diol, i.e., up to 2% (w/v), and at least one bioadhesive polymer. It was highly surprising that this low amount of propane-1, 2-diol was capable of having therapeutic effect when the prior art as represented by U.S. Pat. No. 8,513,225 required at least 15% propane-1,2-diol and disclosed a hydrogel comprising 80% propane-1,2-diol. Such high concentrations of propane-1,2-diol have, however, been associated with adverse effects following topical, oral, and intravenous administration, including CNS toxicity, hyperosmolarity, hemolysis, cardiac arrhythmia, and lactic acidosis (Glascow, et al. (1983) *Pediatrics* 72(3), 353-355). Furthermore, topical administration of high concentrations of propane-1,2-diol have deleterious dehydrating effect as shown in Table I further below.

In the following, the amount of propane-1,2-diol in the pharmaceutical composition is defined as % weight by volume (w/v). In many practical applications of the pharmaceutical composition a % w/v is substantially the same as % weight by weight (w/w). Hence, in some embodiments, a concentration of propane-1,2-diol in the pharmaceutical composition expressed as % w/v also encompasses a corresponding concentration of propane-1,2-diol in the pharmaceutical composition in % w/w.

The at least one bioadhesive polymer enables the pharmaceutical composition to adhere to the mucous membrane or skin to thereby achieve a local administration and release of propane-1,2-diol to the mucous membrane or skin. Accordingly, the at least one bioadhesive polymer enables the pharmaceutical composition to cover a lesion or an inflammatory area in the mucous membrane or skin over the duration of treatment.

The inflammatory condition to be ameliorated, prevented or treated by the pharmaceutical composition of the invention is an inflammatory condition in a mucous membrane or the skin of a subject. In an embodiment, the inflammatory condition is an inflammatory lesion in the mucosa membrane or skin.

The mucosa membrane could be any mucosa in the subject's body including, for instance, bronchial mucosa, the mucosa of the uterus (endometrium), esophageal mucosa, gastric mucosa, intestinal mucosa, nasal mucosa, olfactory mucosa, oral mucosa, frenulum of tongue, the mucosa of the tongue, penile mucosa, vaginal mucosa, the mucosa of the anal canal, and palpebral conjunctiva. In a particular embodiment, the mucosa membrane is the oral mucosa.

In an embodiment, the inflammatory condition is an inflammatory condition or disorder in a mucosa membrane including, for instance, stomatitis, mucositis, recurrent aphthous stomatitis (RAS, also referred to as aphthous stomatitis or canker sores), aphtha minor, aphtha major, recurrent aphthous ulcers (RAU), herpetiform aphthae, vesicular-bullous erosive or ulcerative lesions, pemphigus family disorders, pemphigoid family disorders, linear immunoglobulin A (IgA) disorders, herpetiform dermatitis, discoid lupus erythematosus, radiotherapeutic mucositis, chemotherapeutic mucositis, or oral lichen planus. In an embodiment, the inflammatory condition in the mucous membrane is an inflammatory condition in the oral mucosa, and preferably RAS.

In an embodiment, the inflammatory condition is an inflammatory condition in the skin, for instance, eczema, seborrheic eczema, contact dermatitis, atopic dermatitis, ichthyosis, dry skin, UV dermatitis, blisters, acne, psoriasis, cold sores, pressure sores, diabetic sores, hives, hyperhidrosis, rosacea, keratosis pilaris, actinic keratosis, warts, fungal infections, such as ringworm, athlete's foot, virus disease eruptions from e.g. herpes simples, herpes zoster, chickenpox or measles, and bacterial infections such as impetigo or carbuncles.

In an embodiment, the pharmaceutical composition comprises from 0.001% up to 2% (w/v) propane-1,2-diol. In another embodiment, the pharmaceutical composition comprises from 0.001% up to, but not including, 2% (w/v) propane-1,2-diol.

In an embodiment, the pharmaceutical composition comprises from 0.01 to 2% (w/v) of propane-1,2-diol. In another embodiment, the pharmaceutical composition comprises from 0.01% up to, but not including, 2% (w/v) propane-1,2-diol.

In an embodiment, the pharmaceutical composition comprises from 0.5 to 2% (w/v) of propane-1,2-diol. In another embodiment, the pharmaceutical composition comprises from 0.5% up to, but not including, 2% (w/v) propane-1,2-diol.

In another embodiment, the pharmaceutical composition comprises from 0.5 to 1.5% (w/v) of propane-1,2-diol, preferably from 0.5 to 1.25% (w/v) of propane-1,2-diol, more preferably from 0.5 to 1.0% (w/v) of propane-1,2-diol, such as from 0.6 to 1.0% (w/v) of propane-1,2-diol, or from 0.7 to 0.9% (w/v) of propane-1,2-diol, such as about 0.8% (w/v) of propane-1,2-diol.

Although the preferred concentration of propane-1,2-diol in the pharmaceutical composition is from 0.001 to 2% (w/v), embodiments of pharmaceutical composition may also comprise propane-1,2-diol up to 2.75% (w/v), such as up to 2.5% (w/v) or up to 2.25% (w/v) propane-1,2-diol.

The amounts of propane-1,2-diol comprised in the pharmaceutical composition of the invention has medical effect as disclosed herein but without the adverse effects seen with pharmaceutical compositions comprising significantly higher concentrations of propane-1,2-diol, such as disclosed in U.S. Pat. No. 8,513,225. The pharmaceutical compositions of the present invention do not have any adverse hydration effect, whereas compositions comprising higher concentrations of propane-1,2-diol are dehydrating. Thus, application of compositions comprising a large amount of propane-1,2-diol, such as more than 15%, more than 50% or even higher, such as 80%, will negatively dehydrate the tissue at which the composition is applied.

Furthermore, experimental data as presented herein show that propane-1,2-diol at an amount according to the present invention does not have any significant toxic effects and do not induce any significant cell death. However, already at a concentration of 5% (w/v), propane-1,2-diol induced a significant cell death and was therefore toxic to peripheral blood mononuclear cells.

Thus, a pharmaceutical composition of the present invention has a medical effect as seen in, among others, a significant inhibition of TNF-α and/or IL-2, but with no adverse effects in terms of, among others, dehydration and toxicity as seen for higher concentrations of propane-1,2-diol.

In an embodiment, the pharmaceutical composition comprises from 50 to 99% (w/v) of the at least one bioadhesive polymer, preferably from 60 to 99% (w/v), such as from 70 to 99% (w/v) or 80 to 99% (w/v), and more preferably from 90 to 99% (w/v) of the at least one bioadhesive polymer.

The at least one bioadhesive polymer is capable of adhering to the biological tissue, onto which the pharmaceutical composition is applied. Hence, the at least one bioadhesive polymer is preferably capable of adhering to a mucous membrane and/or to the skin of the subject.

In an embodiment, the at least one bioadhesive polymer is at least one mucoadhesive polymer, i.e., at least one polymer capable of adhering to a mucous membrane.

In an embodiment, the least one mucoadhesive polymer is poly(acrylic acid) (PAA).

PAA, also referred to by its trade name Carbomer, is a synthetic high-molecular weight polymer of acrylic acid. PAA may be homopolymers of acrylic acid, or crosslinked with an allyl ether of pentaerythritol, allyl ether of sucrose, or allyl ether of propylene. In a water solution at neutral pH, PAA is an anionic polymer, i.e., many of the side chains of PAA will lose their protons and acquire a negative charge. This makes PAAs polyelectrolytes, with the ability to absorb and retain water and swell to many times their original volume. The pharmaceutical use of PAA is described in the Pharmacopoeias; BP 93 and in USP 23. In general, the carbomer resins that are intended for oral and mucosal applications are designated by a "P" (934P, 974P, 971P).

PAA is swellable in water, due to a high percentage of carboxylic acid groups in the polymer. When dispersed in water, the PAA molecules partially swell, which increases viscosity. When neutralized with a water-soluble base, the PAA molecules swell completely, with a dramatic increase in the viscosity. In an alkaline environment, the carboxyl groups of PAA dissociate; electrostatic repulsions between the negatively charged carboxyl groups cause uncoiling and expansion of the PAA molecule. This results in swelling of the polymer and gel formation. The gel is composed of closely packed swollen particles with swelling that increases with an increase in pH.

PAA is advantageous as bioadhesive polymer since it is physiologically inert and is not absorbed from the gastrointestinal tract into systemic circulation. PAA has good mucoadhesive properties. When used as carriers for propane-1,2-diol, the PAA polymers could increase the propane-1,2-diol concentration at the administration site, by localizing propane-1,2-diol to their site of absorption. Thus, absorption is enhanced and bioavailability may increase. Furthermore, PAA formulations may provide sustained release characteristics to the pharmaceutical composition. Under both simulated gastric and intestinal fluids, PAA provides control release (CR) at a lower concentration than other CR systems. Furthermore, PAA protects the underlying cell layer, forming a thick barrier that separates the cells from the environment due to its continuous cross-linking and to the fact that it is water insoluble. For tablet dosage forms, PAA is a good disintegrant and a directly compressible vehicle. PAA produces tablets with excellent hardness and friability over a range of compression forces.

In particular embodiment, the PAA is selected from the group consisting of a PAA having an average viscosity from 29,400 to 39,400 cP at 25° C. of a 0.5 wt % aqueous solution at a pH from 7.3 up to 7.8 as determined by a Brookfield viscometer (Brookfield RVT, 20 rpm, spindle #6), a PAA having an average viscosity from 4,000 to 11,000 cP at 25° C. of a 0.5 wt % aqueous solution at a pH from 7.3 up to 7.8 as determined by a Brookfield viscometer (Brookfield RVT, 20 rpm, spindle #5), and a combination thereof. Such PAAs are marketed as Carbopol 974P NF, Carbopol 971P NF and Carbopol 71G NF, respectively.

Carbopol 71G NF polymer is a free-flowing granular form of Carbopol 971P NF polymer, for use in direct compression formulations. It is manufactured by roller compaction of Carbopol 971P NF polymer and is chemically the same product, with no additives. The resulting granules are free flowable, have increased bulk density, and contain minimal amounts of very small particles that can cause dusting and/or static adherence compared to the powder polymer.

Other examples of bioadhesive polymers that can be used according to the invention include alginate polymers. Alginate, the salt of alginic acid, is a linear polysaccharide naturally produced by brown seaweeds (Phaeonphyceae, including *Laminaria*). Alginate is composed of multiple monomer residues, typically 100 to 3 000 monomers, linked together in a flexible chain. These residues are mainly of β-(1→4)-linked D-mannuronic acid (M) residues and β-(1→4)-linked L-guluronic acid (G) residues. These two residues are epimers and only differ at C5. In the polymer chain, they though give rise to very different conformations with any two D-mannuronic acid residues being $^4C_1$-diequatorially linked while the link connecting any to L-guluronic acid residues is a $^1C_4$-diaxial link as is illustrated in formula I:

Formula I

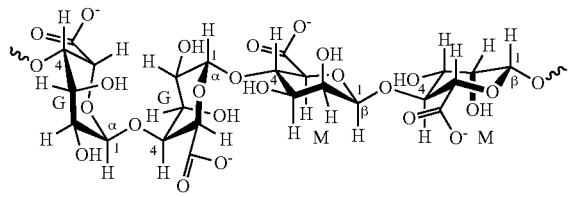

The residues are generally organized in blocks of identical or strictly alternating residues, e.g. MMMMMM . . . , GGGGGG . . . , or GMGMGM . . . .

The alginate polymers form, in the presence of monovalent cations, dissolvable solid particles. This is in clear contrast to the case, when the alginate polymers are instead in contact with divalent cations, such as $Ca^{2+}$. The divalent cations form links between different alginate polymers to thereby achieve cross-linking between the alginate polymers. The cross-linking in turn leads to the formation of an alginate film that is generally not dissolvable or at least difficult to dissolve in moist environments.

Suitable monovalent cations that can be used include sodium ions ($Na^+$), potassium ions ($K^+$) and ammonium ions ($NH_4^+$), preferably $Na^+$.

In an embodiment, the pharmaceutical composition comprises at least one excipient in addition to propane-1,2-diol and the at least one bioadhesive polymer. Non-limiting, but illustrative, examples of such excipients include antiadherents, binders, coatings, colors, disintegrants, flavors, glidants, lubricants, preservatives, sorbents, solvents, buffers, stabilizers, adjuvants, diluents, humectants, surfactants, osmotic agents, sweeteners and vehicles. In a particular embodiment, the at least one excipient is selected from the group consisting of microcrystalline cellulose, povidone (also referred to as polyvinylpyrrolidone (PVP)), magnesium stearate and a combination thereof.

In an embodiment, the pharmaceutical composition comprises microcrystalline cellulose at an amount of from 2.5 to 15% (w/w), preferably from 5 to 10% (w/w), and more preferably from 7 to 9% (w/w) or from 7 to 8% (w/w), such as about 7.9% (w/w).

In an embodiment, the pharmaceutical composition comprises povidone at an amount of from 0.01 to 5% (w/w), preferably from 0.01 to 1% (w/w), and more preferably from 0.05 to 0.5% (w/w), such as about 0.1% (w/w). Povidone as used herein does not include povidone iodine. In an embodiment, povidone as used herein is 1-ethenylpyrrolidin-2-one.

In an embodiment, the pharmaceutical composition comprises magnesium stearate at an amount of from 0.01 to 5% (w/w), preferably from 0.01 to 2.5% (w/w), and more preferably from 0.1 to 1% (w/w), such as about 0.5% (w/w).

In an embodiment, the pharmaceutical composition is formulated, i.e., adapted, for local application to the inflammatory area or lesion. In a preferred embodiment, the pharmaceutical composition is formulated for topical application or administration. Such topical application may include dermal, mucosal, sublingual, buccal, intranasal, ocular, rectal, or intravaginal application, depending on the site of the inflammatory area or lesion.

The pharmaceutical composition is, in an embodiment, in a dosage form selected from the group consisting of a patch, a film, a tablet, a cream, an ointment, a foam, a gel, and a spray.

For instance, a patch may be in the form of a dermal patch or a mucoadhesive patch, such as a mucoadhesive buccal patch. Such a patch may be shaped to cover the inflammatory area or lesion and, due to the presence of the at least one bioadhesive polymer, such as at least one mucoadhesive polymer, may adhere to the inflammatory area or lesion throughout the duration of treatment.

A mucoadhesive patch can be manufactured according to various embodiments including in the form of a mucoadhesive tablet, a mucoadhesive film or a mucoadhesive gel depending on the particular ingredients and concentrations of the pharmaceutical composition.

In the case of a film, cream, ointment, foam or gel, the film, cream, ointment, foam or gel is preferably capable of adhering to the mucous membrane and/or the skin, i.e., is preferably a dermal film, a mucoadhesive film, such as a mucoadhesive buccal film. The presence of the at least one bioadhesive polymer in the pharmaceutical composition enables the film, cream, ointment, foam or gel to adhere to the inflammatory area or lesion in the mucous membrane and/or skin. Such a film, cream, ointment, foam or gel may, thus, be used as a "medical bandage" or patch to cover the inflammatory area or lesion and at the same time release propane-1,2-diol to facilitate the healing process.

A pharmaceutical composition formulated as a tablet is preferably in the form of a dermal or mucoadhesive tablet, i.e., such a tablet capable of adhering to the skin or a mucosa membrane of a subject. Such a tablet may comprise, in addition to propane-1,2-diol and the at least one bioadhesive polymer, a bulking agent, such as microcrystalline cellulose (MCC), a binder, such as povidone, and a lubricant, such as magnesium stearate. The presence of the at least one bioadhesive polymer gives the formed tabled adhesive, such as mucoadhesive, properties that means that once the tablet is contacted with the inflammatory area or lesion in the mucous membrane or skin, the tablet will attach thereto to provide a continuous release of propane-1,2-diol to the inflammatory area or lesion.

A pharmaceutical composition in the form of a spray also have adhesive properties due to the presence of the at least one bioadhesive polymer. The spray is preferably sprayed onto the inflammatory area or lesion in the mucous membrane or skin. The hygroscopic and/or viscosity properties of the spray formulation may be adjusted by inclusion of various excipients that adjust the viscosity and/or hygroscopy of the pharmaceutical composition.

Generally, galenic properties of the pharmaceutical composition could be adjusted by components such as dextran, starch-acrylonitrile co-polymer, soy protein/poly(acrylic acid) superabsorbent polymers, polyacrylate/polyacrylamide copolymers, polyacrylamide copolymer, ethylene maleic anhydride copolymer, cross-linked carboxymethylcellulose, polyvinyl alcohol copolymers, cross-linked polyethylene oxide, and/or or starch grafted copolymer of polyacrylonitrile.

The pharmaceutical composition may be applied to the inflammatory area or lesion by an applicator. In such an embodiment, a hand-held applicator can be used to enable convenient and hygienic dispensing and uniform spreading of topical preparations like creams, ointments, foams and gels and facilitating the application of an oral patch formulation. The applicator can be used to orally deliver the pharmaceutical composition to the desired mucosal sites in the oral cavity. In the case an applicator is used, it can include three primary components: an applicator barrel, a tip to hold the pharmaceutical composition to be delivered, and a plunger. In practical use, a medical preparation can be placed into the tip. The tip, which conforms to the shape of the medical intervention, firmly grips or envelops the pharmaceutical composition depending upon the size or volume. The applicator is then inserted into or applied over the desired site of application. Once in place the plunger is depressed, and the pharmaceutical composition is applied to the desired anatomical site.

Mucoadhesion is a complex phenomenon, which involves wetting, adsorption and interpenetration of polymer chains. When relating this mechanism to the pharmaceutical sciences, mucoadhesion describes the attractive forces between a pharmaceutical composition and the mucus or mucous membrane.

The mucoadhesive process comprises two general steps: the contact stage and the consolidation stage. The contact stage is the initial wetting that occurs between the pharmaceutical composition and the mucous membrane. This can occur mechanically by bringing together the two surfaces, or through the bodily systems, like when particles are deposited in the nasal cavity by inhalation. The consolidation stage of mucoadhesion involves the establishment of adhesive interactions to reinforce strong or prolonged adhesion. When moisture is present, mucoadhesive materials become activated and the system becomes plasticized. This stimulus allows the mucoadhesive molecules to separate and break free while proceeding to link up by weak van der Waals and hydrogen bonds. Multiple mucoadhesion theories exist that explain the consolidation stage, of which the main two theories focus on macromolecular interpenetration and dehydration.

The subject to be treated with the pharmaceutical composition of the invention is preferably a human subject. The pharmaceutical composition may, however, also be applied in veterinary applications, where the subject is an animal, preferably a non-human mammals, such as cat, dog, horse, sheep, pig, cow, goat, rabbit, guinea pig, rat, mouse etc.

According to the invention, the pharmaceutical composition lacks any anti-inflammatory agent besides propane-1, 2-diol. Hence, propane-1,2-diol is the only active anti-inflammatory agent in the pharmaceutical composition.

In an embodiment, the pharmaceutical composition does not comprise any active agent or ingredient, in particular no active agent or ingredient having anti-inflammatory effect, in addition to propane-1,2-diol.

Hence, any additional ingredients of the pharmaceutical composition are the bioadhesive polymer or polymers and one or more excipients. These one or more excipients and the bioadhesive polymer or polymers are not regarded as being active agents or ingredients in the pharmaceutical composition.

The pharmaceutical composition of the invention cannot only be used to ameliorate, prevent or treat an inflammatory condition as disclosed herein. The pharmaceutical composition can also, or alternatively, be used in treatment of pain associated with, or caused by, an inflammatory condition in a mucous membrane or skin of a subject. In such a case, the pharmaceutical composition comprises from 0.001 to 2% (w/v) of propane-1,2-diol and at least one bioadhesive polymer. The pharmaceutical composition lacks any anti-inflammatory agent besides propane-1,2-diol Hence, the pharmaceutical composition provides relief of discomfort and pain caused by the inflammatory condition in the skin or the mucosa membrane, in particular in inflammatory conditions in the oral cavity, such as RAS.

Related aspects of the invention involve a method for ameliorating, preventing or treating an inflammatory condition in a mucous membrane or skin of a subject or a method for treating pain associated with an inflammatory condition in a mucous membrane or skin of a subject. These methods comprise administering a pharmaceutical composition of the invention, i.e., comprising from 0.001 to 2% (w/v) of propane-1,2-diol and at least one bioadhesive polymer and wherein the pharmaceutical composition lacks any anti-inflammatory agent besides propane-1,2-diol.

The pharmaceutical composition is preferably locally administered to the inflammatory area or lesion, such as topically added to the inflammatory area or lesion in the mucous membrane or skin as disclosed herein.

Treatment of an inflammatory condition or treatment of pain associated with an inflammatory condition as used herein also encompasses inhibition of the inflammatory condition or inhibition of pain associated with the inflammatory condition. Inhibition of the inflammatory condition or pain associated with the inflammatory condition as used herein implies that the pharmaceutical composition of the invention reduces the symptoms and effects of the condition even though a 100% treatment or cure does not necessarily occur.

Further relates aspects of the invention involve use of a pharmaceutical composition of the invention, i.e., comprising from 0.001 to 2% (w/v) of propane-1,2-diol and at least one bioadhesive polymer and wherein the pharmaceutical composition lacks any anti-inflammatory agent besides propane-1,2-diol, for the manufacture of a medicament for ameliorating, preventing or treating an inflammatory condition in a mucous membrane or skin of a subject or for treating pain associated with an inflammatory condition in a mucous membrane or skin of a subject.

Another aspect of the invention relates to an anti-inflammatory pharmaceutical composition comprising 0.001 to 2% (w/v) of propane-1,2-diol and 50 to 99% (w/v) of poly (acrylic acid) (PAA).

In an embodiment, the anti-inflammatory pharmaceutical composition comprises from 0.01 to 2% (w/v) of propane-1,2-diol, preferably from 0.5 to 2% (w/v) of propane-1,2-diol, and more preferably from 0.8 to 2% (w/v) of propane-1,2-diol.

In an embodiment, the anti-inflammatory pharmaceutical composition comprises from 60 to 99% (w/v), such from 70 to 99% (w/v) or 80 99% (w/v), and preferably from 90 to 99% (w/v) of PAA.

In an embodiment, the PAA is selected from the group consisting of a PAA having an average viscosity from 29,400 to 39,400 cP at 25° C. of a 0.5 wt % aqueous solution at a pH from 7.3 up to 7.8 as determined by a Brookfield viscometer, a PAA having an average viscosity from 4,000 to 11,000 cP at 25° C. of a 0.5 wt % aqueous solution at a pH from 7.3 up to 7.8 as determined by a Brookfield viscometer, and a combination thereof.

In an embodiment, the anti-inflammatory pharmaceutical composition comprises at least one excipient selected from the group consisting of microcrystalline cellulose, povidone, magnesium stearate and a combination thereof.

In a particular embodiment, the anti-inflammatory pharmaceutical composition comprises microcrystalline cellulose at an amount of from 2.5 to 15% (w/w), preferably from 5 to 10% (w/w), and more preferably from 7 to 9% (w/w) or from 7 to 8% (w/w), such as about 7.9% (w/w). In another particular embodiment, the anti-inflammatory pharmaceutical composition, instead or in addition, comprises povidone at an amount of from 0.01 to 5% (w/w), preferably from 0.01 to 1% (w/w), and more preferably from 0.05 to 0.5% (w/w), such as about 0.1% (w/w). In a further particular embodiment, the anti-inflammatory pharmaceutical composition, instead or in addition, comprises magnesium stearate at an amount of from 0.01 to 5% (w/w), preferably from 0.01 to 2.5% (w/w), and more preferably from 0.1 to 1% (w/w), such as about 0.5% (w/w).

In an embodiment, the anti-inflammatory pharmaceutical composition lacks any anti-inflammatory agent besides propane-1,2-diol.

In an embodiment, the anti-inflammatory pharmaceutical composition consists of 0.001 to 2% (w/v) of propane-1,2-diol and 50 to 99% (w/v) of PAA. In another particular embodiment, the anti-inflammatory pharmaceutical composition consists of 0.001 to 2% (w/v) of propane-1,2-diol, 50 to 99% (w/v) of PAA and at least one excipient selected from the group consisting of microcrystalline cellulose at an amount of from 2.5 to 15% (w/w), povidone at an amount of from 0.01 to 5% (w/w), and magnesium stearate at an amount of from 0.01 to 5% (w/w). In these embodiments, the amounts of all ingredients in the anti-inflammatory pharmaceutical composition sum up to 100%.

Further aspects of the invention comprises the anti-inflammatory composition for use as a medicament, for use in amelioration, prevention or treatment of an inflammatory condition a mucous membrane or skin of a subject and/or for use in treatment of pain associated with an inflammatory condition a mucous membrane or skin of a subject.

Related aspects of the invention involve a method for ameliorating, preventing or treating an inflammatory condition in a mucous membrane or skin of a subject or a method for treating pain associated with an inflammatory condition in a mucous membrane or skin of a subject. These methods comprise administering an anti-inflammatory pharmaceutical composition comprising 0.001 to 2% (w/v) of propane-1,2-diol and 50 to 99% (w/v) of PAA.

The anti-inflammatory pharmaceutical composition is preferably locally administered to the inflammatory area or lesion, such as topically added to the inflammatory area or lesion in the mucous membrane or skin as disclosed herein.

The invention also relates to use of an anti-inflammatory pharmaceutical composition comprising 0.001 to 2% (w/v) of propane-1,2-diol and 50 to 99% (w/v) of PAA for the manufacture of a medicament for use in amelioration, prevention or treatment of an inflammatory condition a mucous membrane or skin of a subject and/or for use in treatment of pain associated with an inflammatory condition a mucous membrane or skin of a subject.

A further aspect of the invention relates to a mucoadhesive tablet, such as a mucoadhesive buccal tablet. The mucoadhesive tablet comprises a pharmaceutical composition according to the invention or an anti-inflammatory pharmaceutical composition according to the invention.

EXAMPLES

Example 1: In Vitro Culture of Human PBMCs

Human venous blood was sampled and collected in heparinized vials and mix well by gently inverting the tubes several times. Human peripheral blood mononuclear cells (PBMCs) were isolated by gradient centrifugation using Ficoll-Histopaque®.

Cells were washed (centrifuged at 400×g for 10 min) with sterile phosphate-buffered saline (PBS). PBS was discarded, and the cell pellet re-suspended in sterile Dulbecco's Modified Eagle's Medium (DMEM). Cells were then counted by haemocytometer using white blood cell (W.B.C.) diluting fluid: 15 µl of cell suspension was added to 15 µl trypan blue and mixed well. The cell suspension was loaded in a haemocytometer and the cells were counted. The cell concentration was adjusted at $2\times10^6$ cells/ml with DMEM supplemented with 1% of penicillin-streptomycin solution and 5% human serum. The approximate yield of cells varied between $10^7$-$10^8$ cells/ml.

1 ml of cell suspension was seeded in a 24 well culture plate. 1 ml propane-1,2-diol diluted in DMEM was added at various concentrations (from 0 to 100 mM). Phytohemagglutinin (PHA), 15 µl, was added to a final concentration of 1 µg/ml. When the effect of different concentrations of PHA were studied (FIG. 1), the range used varied from 0 to 25 µg/ml. The plate was incubated for 24 h at +37° C. and in 5% $CO_2$. The plate was then frozen at −20° C. until further analysis. After thawing the samples, an enzyme-linked immunosorbent assay (ELISA) was performed according to the manufacturer's specifications.

Example 2: Inhibition of TNF-α Production in Human PBMC In Vitro

The immunopathogenesis of aphthous stomatitis is believed to be T cell-mediated. The objective of this Example was to characterize the cytokine profile of PBMCs, with particular emphasis on the effect of using propane-1,2-diol. The production of the cytokine tumor necrosis factor-alpha (TNF-α) on lipopolysaccharides (LPS) stimulated PBMC was analyzed.

In vitro culture of human PBMCs was performed as described above in Example 1. In brief, 1 ml propane-1,2- diol was added to 1 ml PBMC to obtain a range of 30 final concentrations (0 to 100 mM). 15 µl LPS was added to a final concentration of 100 nM and the cell suspension was incubated at 37° C. in 5% $CO_2$ for 24 h. The plate was then frozen in −20° C. until the ELISA analysis.

TNF-α production was determined by ELISA using procedures (BioSite, Sweden; Art. No: EA102165) according to the manufacturer's specifications.

The results (FIGS. 1A to 1D) show a concentration-dependent inhibition of TNF-α when PBMC was stimulated with LPS. As expected, the curves were somewhat different as the PBMCs were obtained from 4 different individuals. A maximal inhibition of TNF-α was obtained at 100 mM propane-1,2-diol.

Figure 2:
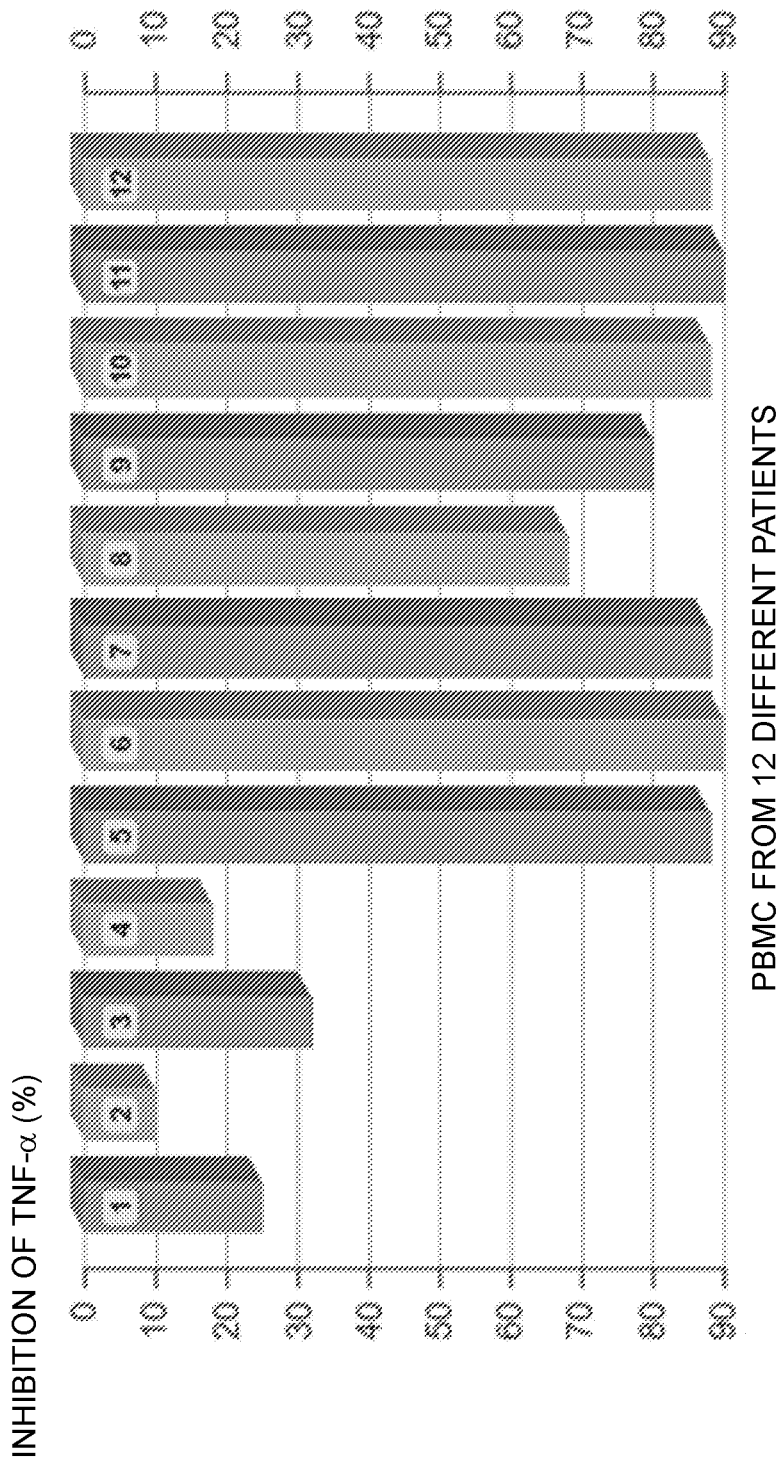
FIG. 2 shows the effect of 100 mM propane-1,2-diol on the inhibition TNF-α when PBMC (buffy coats from 12 patients) was stimulated with LPS.

FIG. 2 shows the inhibition of TNF-α by 100 mM propane-1,2-diol using LPS-stimulated PBMCs from 12 different individuals. An inhibition was observed in all 12 individuals.

Example 3: Inhibition of IL-2 Production in Human PBMC In Vitro

The immunopathogenesis of aphthous stomatitis is believed to be T cell-mediated. The objective of this Example was to characterize the cytokine profile of PBMCs, with particular emphasis on the effect of using propane-1,2-diol. The production of the cytokine interleukin-2 (IL-2) on PHA-stimulated PBMC was analyzed.

In vitro culture of human PBMCs was performed as described above in Example 1. In brief, 1 ml propane-1,2-diol was added to 1 ml PBMC to obtain a range of final concentrations (0 to 100 mM). 15 µl PHA was added to a final concentration of 1 µg/ml and the cell suspension was incubated at +37° C. in 5% $CO_2$ for 24 h. The plate was then frozen in −20° C. until the ELISA analysis.

IL-2 production was determined by ELISA using procedures (BioSite, Sweden; Art. No: EA102165) according to the manufacturer's specifications.

Figure 3:
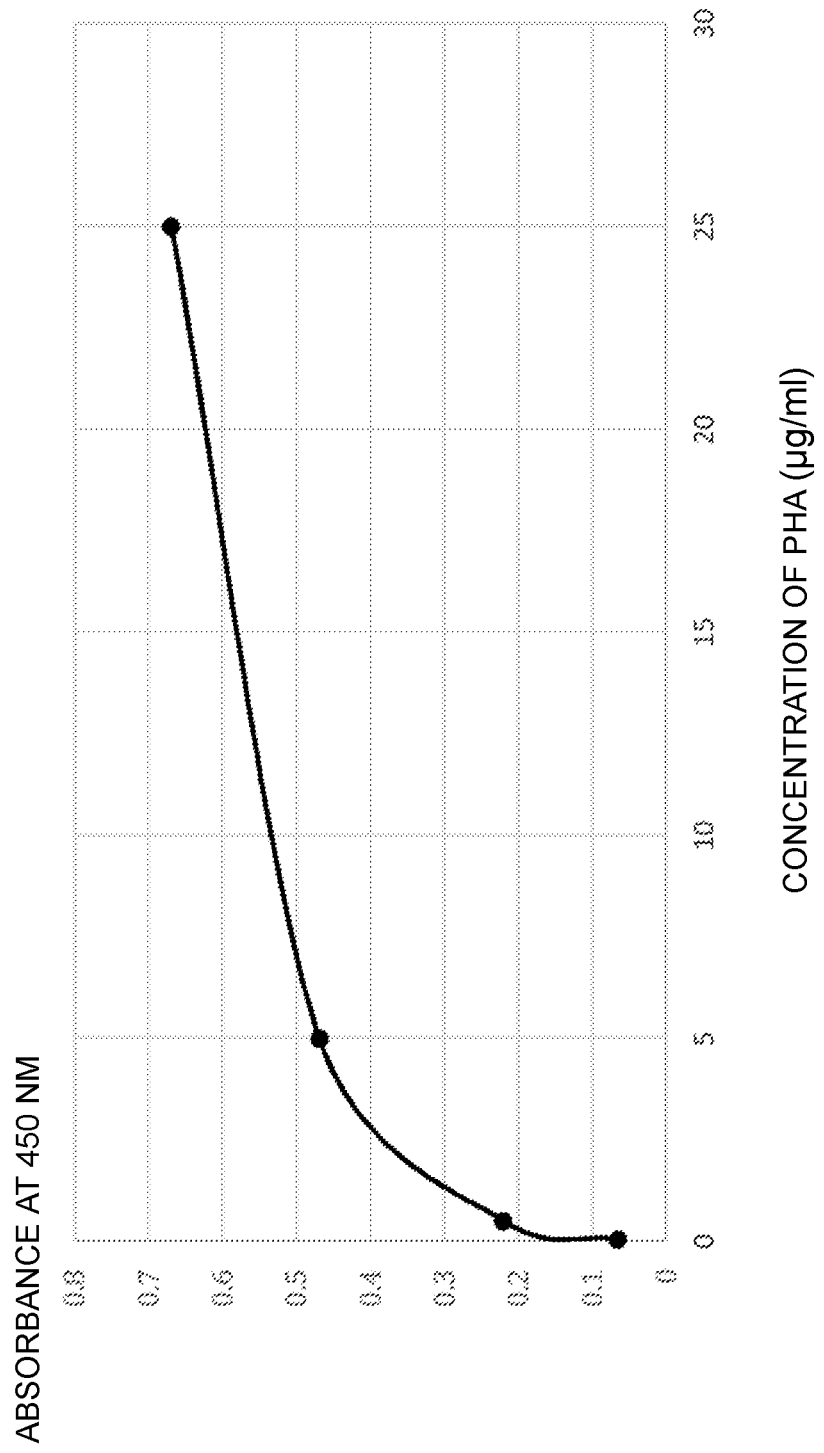
FIG. 3 shows the IL-2 production following increasing concentrations of phytohemagglutinin (PHA).

FIG. 3 shows the IL-2 production following increasing concentrations of PHA. The experiment was performed to establish the suboptimal concentrations that should be used to study the effect of increasing concentrations of propane-1,2-diol on the production of IL-2 PBMC.

Figure 4:
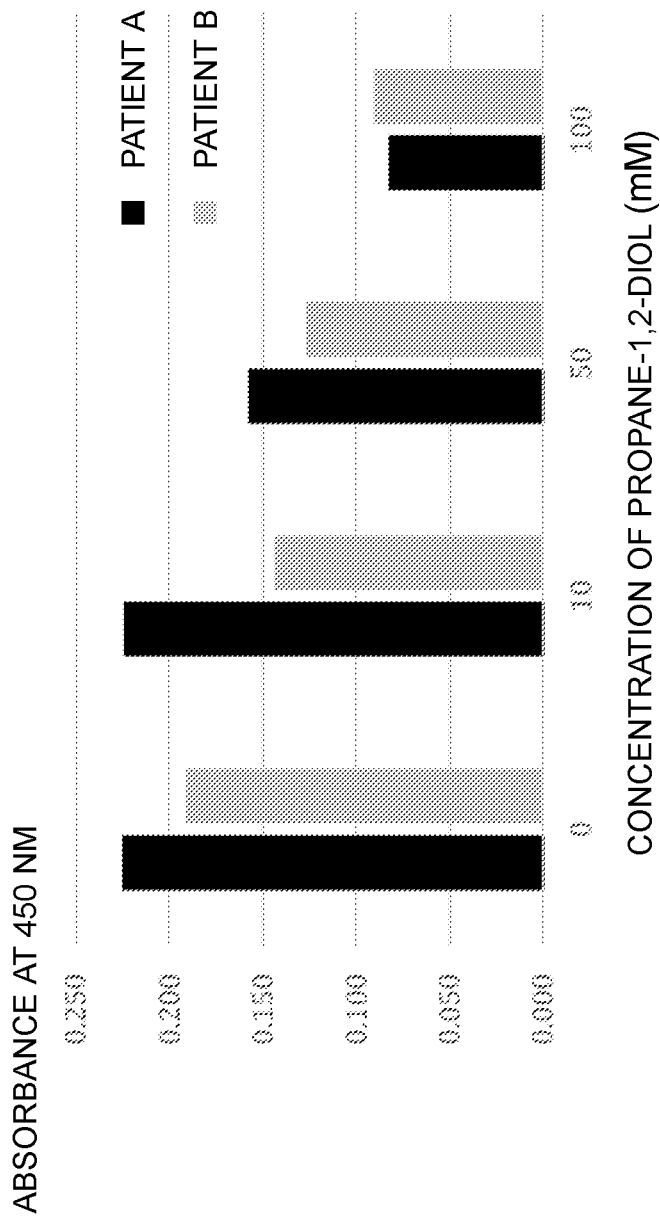
FIG. 4 shows the effect of different concentrations of propane-1,2-diol on IL-2 production by 1 µg/ml PHA-stimulated PBMC from two different patients.

FIG. 4 shows the effect by different concentrations of propane-1,2-diol on IL-2 production by 1 µg/ml PHA-stimulated PBMC from two different patients. IL-2 production was reduced by 53% in patient A and 64% in patient B at 100 mM propane-1,2-diol.

Example 4: Osmotic Effects of the Preparation

A study was made to demonstrate the relationship between the concentration of propane-1,2-diol and its dehydration effect towards oral mucosa. Fresh pig oral mucosa (300-700 mg) was equilibrated at room temperature at 40% relative humidity (RH), weighed and immersed in 5 ml of the investigated solution for 20 h at room temperature (RT, ~20-25° C.). The tissue was removed from the solution, dried by blotting and weighed. Finally, it was dried at +40° C. for 24 h.

Table I shows the calculated osmotic pressure of the investigated solutions and dehydration effect observed after immersing the mucosal tissue in the solutions for 24 h.

TABLE I osmotic pressure and dehydration effect

| Sample | PG concentration [% w/v] | Osmotic pressure (calculated) [mOsmol/l] | Dehydration [%] | Dehydration* [%] |
|---|---|---|---|---|
| A | 1% | 132 | 100 | 318 |
| B | 5% | 658 | 100 | 398 |
| C | 20% | 2632 | 100 | 297 |
| D | 50% | 6579 | 85.2 | 196 |
| E | 80% | 10526 | 65.7 | 136 |
| F | 100% | 13158 | 57.4 | 110 |
| G | 80%, 20% gly* | 13158 | 67.9 | 116 |
| H | 0 (water) | 0 | 106 | 327 |

Figure 5A:
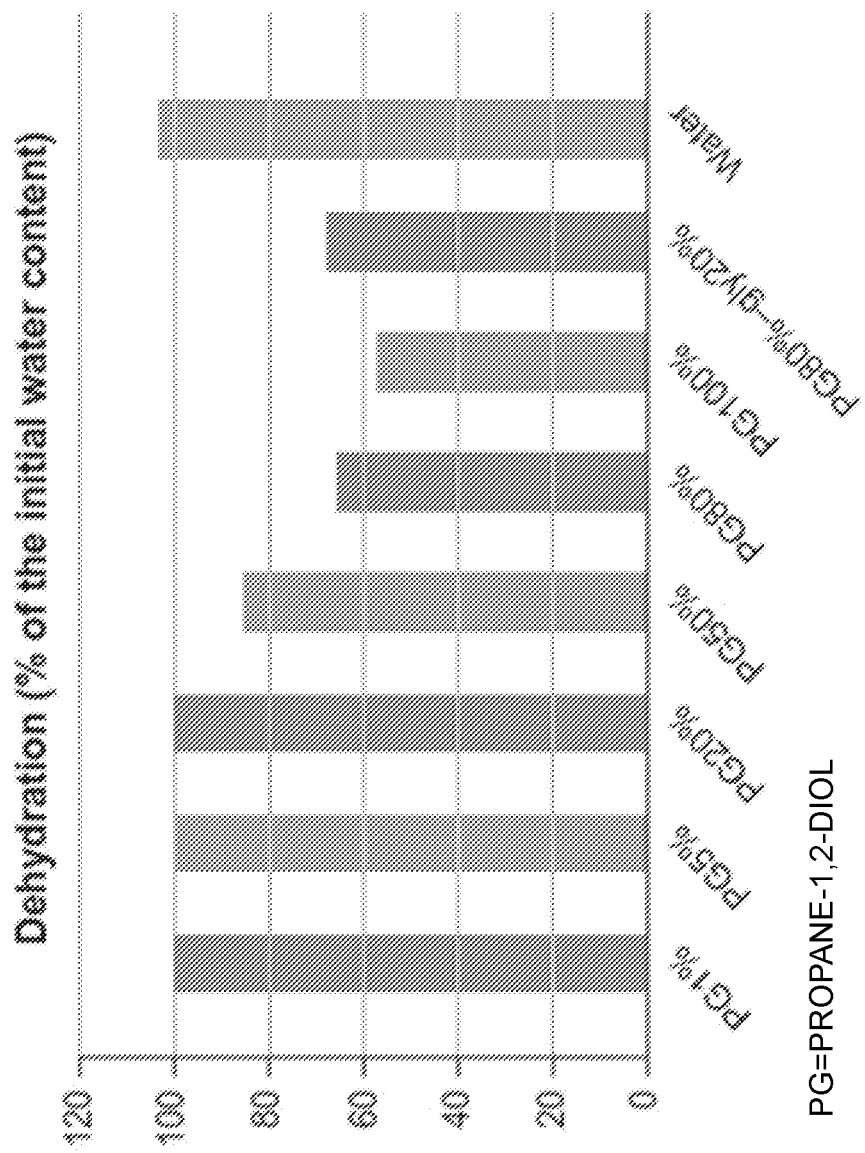
FIG. 5 shows (5A) the difference between mucosal tissue weight and (5B) its water content, after contact with water or propylene glycol solutions.
Figure 5B:
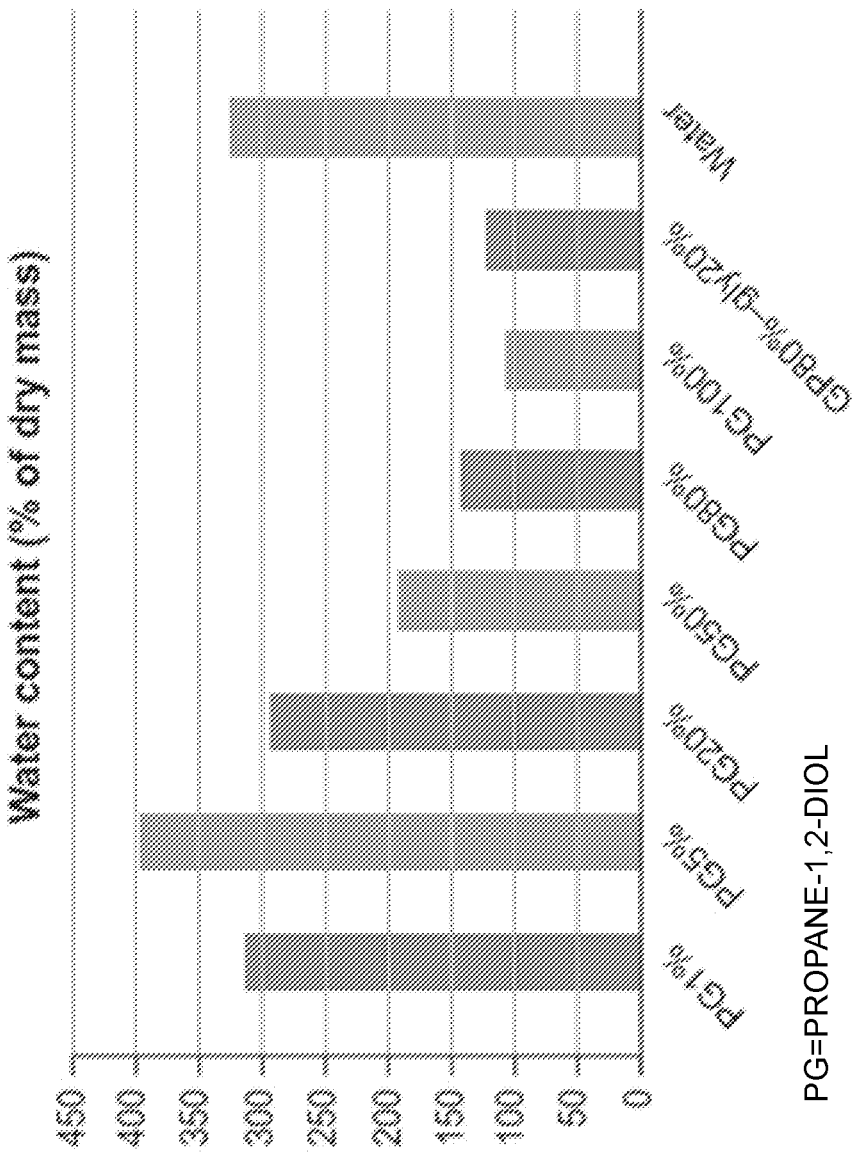

*Mixture (8:2) of propane-1,2-diol and glycerol 85%;
**Reduction of the wet tissue weight;
***Water content as % of the dry tissue weight From the results shown in Table I, as well as in FIG. 5, the following conclusions can be drawn:
  No dehydration effect was shown for propane-1,2-diol solutions at concentration of 1% and 5%.
  A dehydration effect was evident for propane-1,2-diol solutions at concentrations 50%, 80% and 100%, with no difference between mixtures with water or glycerol (85%).
  The concentration of propane-1,2-diol necessary for obtaining a dehydration effect exceeds the concentration (100 mM; corresponding to 0.8% w/v), which was sufficient for obtaining an inhibitory effect on TNF-α production (Example 2) and IL-2 production (Example 3). Consequently, the inhibitory effects shown in Example 2 and 3 were not caused by a dehydration effect.

Example 5: Preparation of Compositions

Compositions can be prepared according to standard methods as shown by the following examples.

Batch 1

Preparation and tests of a solution and a gel comprising propane-1,2-diol (propylene glycol). A mucosal spray or liquid for topical use (1a) and a gel (1b) were then prepared according to the compositions provided below. These propane-1,2-diol formulations had a fully acceptable, aromatic and slight sweet taste.

With regard to liquids, sprays and gels, pH is advantageously adjusted to 6.0-6.5 and preservatives may be added.

(1a) Mucosal Spray or Liquid for Topical Use
Propane-1,2-diol 0.8 g;
Carbomer or hydroxyethyl cellulose 0.5 g;
Glycerol 5.0 g; and
Water to 100.0 g.

(1b) Mucoadhesive Gel for Topical Use
Propane-1,2-diol 0.8 g;
Carbomer or sodium carmellose 1.0 g;
Glycerol 5.0 g; and
Water to 100.0 g.

Batch 2

Preparation and tests of a mucoadhesive patch. The patch was round and approximately 1 cm in diameter. This patch contained 0.8% propane-1,2-diol, allowing for a sufficient amount in the ulcer tissue at the site of patch administration. It was manufactured by dry, i.e., without water, compression after mixing the constituents; propane-1,2-diol, Carbopol 974P NF, and additional constituents according to the formulation described below.

(2a) Mucoadhesive Patch Formulation for Mucosal Use
Carbomer Carbopol 974P NF (Lubrizol, Brussels, Belgium) 99.0%
Propane-1,2-diol (Propylene glycol) (POCH, Gliwice, Poland) 0.8%
Menthol 0.2%
Color E131 and E132
Specifics of Appearance and Manufacture:
Diameter: 11 mm
Thickness: 1.40 mm
Weight: 0.85-0.90 mg
Compression: 300 kg
Batch 3
Preparation of mucoadhesive patches for testing. The patches contained the carbomer Carpopol 71G NF polymer (Lubrizol). The patch was round and approximately 1 cm in diameter. It was manufactured by compression after mixing the constituents; propane-1,2-diol, Carbopol, 71G NF, microcrystalline cellulose, povidone and magnesium stearate according to the description provided below.

(3a) Mucoadhesive Patch in the Form of Mucoadhesive Buccal Tablets with Propylene Glycol (Propane-1,2-Diol).

TABLE II formulation

| Ingredient (Brand name) | Ingredient (Ph. Eur.) | [%] |
|---|---|---|
| Vivapur 101* | Microcrystalline cellulose | 7.9 |
| Propylene glycol* | | 2.0 |
| Kollidon 30* | Povidone | 0.1 |
| Carbopol 71G NF | Carbomer | 89.5 |
| Magnesium stearate | | 0.5 |

*wet granulation

Production Steps:
1. Wet granulation:
   Dry excipient: microcrystalline cellulose (Vivapur 101)—10.0 g
   Binding solution: 2.5 g of 5% Kollidon 30 solution and 2.5 g of propylene glycol
   Procedure: Wet mixing in a mortar, wet screening (0.6 mm), drying (30 min/50° C.), dry screening (0.5 mm)
2. Dry mixing with Carpopol G71
3. Mixing with the magnesium stearate (0.5%) lubricant
4. Compression using a Gamlen D-series laboratory press, 7 mm flat punch with a compression load of 300 kg, a compression speed of 120 mm/min.
Tablet weight: 50 mg
Tablet thickness: 1.2 mm (3b) Mucoadhesive Patch in the Form of Mucoadhesive Buccal Tablets with Propylene Glycol (Propane-1,2-Diol).

TABLE III formulation

| Ingredient (Brand name) | Ingredient (Ph. Eur.) | [%] |
|---|---|---|
| Vivapur 101* | Microcrystalline cellulose | 7.9 |
| Propylene glycol* | | 0.8 |
| Kollidon 30* | Povidone | 0.1 |
| Carbopol 71G NF | Carbomer | 90.7 |
| Magnesium stearate | | 0.5 |

*wet granulation

The production was done as described above for (3a) Mucoadhesive patch.

Tablet weight: 50 mg
Tablet thickness: 1.2 mm

Example 6: Treatment or Prevention of RAS

Case examples of patients are described to illustrate the properties of a gel or patch formulation for management of aphthous ulcers of various severity and distribution. Further, the application of patch or gel formulations on the buccal mucosa to healthy normal volunteers is described to demonstrate the mucoadhesive properties of the various formulations, as well as duration of patch or gel adherence, and aspects of tolerability.

Subject 1 was a 25-year-old female, who experiences recurrent aphthous stomatitis (RAS) sores 5-6 times per year, which routinely required up to 2 weeks to heal, with or without various standard treatments. On the day following appearance of the canker sore, a mucoadhesive buccal gel containing of propane-1,2-diol (batch 1b in Example 5) was applied and left in place for 1 hour. This generated an immediate relief of pain from the RAS lesions. The patch containing propane-1,2-diol was experienced by the patient to have a similar effect as treatment with topical corticosteroids.

Subject 2 was a 34-year-old male, experiencing severe pain and inflammation from aphthous ulcers on the lower lip, and on the tongue. The patient also experienced prodromal symptoms on the right side on the lower lip. A patch, containing propane-1,2-diol (batch 2a in Example 5) was applied on each side of the lower lip. At a follow-up visit 3 days later, the patient reported no symptoms from the left side of the lower lip, although there was a small aphthous ulcer in this position, with minimal visible inflammation. There was no development of any aphthous ulceration on the right side of the lower lip. The untreated ulcer on the tongue remained and no healing was observed.

Subject 3 was a 66-year-old man without any ongoing signs of RAS sores. A mucoadhesive patch containing propane-1,2-diol (batch 2a in Example 5) was prepared according to the invention was applied on normal buccal mucosa. The subject experienced that the patch was immediately and strongly adhering to the mucosal tissue, and it remained in place for at least 60 minutes. There were no adverse reactions, and the subject experienced no untoward effects during the time the patch was in place on the buccal mucosa. After 60 minutes, the buccal patch had been completely dissolved.

Subject 4 was a 65-year-old man with a history of recurrent aphthous ulcers, but with no ulcers at the time of testing of a mucoadhesive gel containing propane-1,2-diol (batch 1b in Example 5) was prepared according to the invention. The gel was applied on the buccal mucosa on the right side of the oral cavity. An applicator device was used to apply 2 ml of mucoadhesive gel. The subject experienced that the gel formed a mucoadhesive layer on the mucosa, and also that the gel stayed in place on the mucosal surface for 40-60 minutes, after which the gel had been completely dissolved. No adverse experiences were reported by the subject.

Subject 5 was a 74-year-old man, who at the time of testing was without pathology or signs of oral aphthous lesions. A patch containing propane-1,2-diol (batch 2a in Example 5) was prepared according to the invention was applied on the buccal mucosa on the right side of the oral cavity. The subject reported that the patch firmly adhered to the mucosa and that it had completely dissolved about 1 hour after application. The subject reported no adverse experiences.

Example 7

This Example investigated whether the inhibition of TNF-α in Example 2 and/or IL-2 in Example 3 was due to cell death of the PBMCs.

PBMCs were isolated from one donor as described in Example 1. 1 ml of 2×10$^6$ PBMC cells were added to 12 wells in a 24-well plate. 1 ml of 2000 mM propane-1,2-diol was added to two of the wells to get a final concentration of 1000 mM (8% propane-1,2-diol). The same procedure was used to obtain decreasing concentrations of propane-1,2-diol (500 mM (4% propane-1,2-diol), 250 mM (2% propane-1,2-diol), 125 mM (1% propane-1,2-diol), 62.5 mM (0.5% propane-1,2-diol)). After 24 hrs incubation at 37° C. and 5% $CO_2$, 15 µl of each cell culture was mixed with 15 µl of tryptan blue and dead cells out of 100 cells were counted under a light microscope.

Figure 7:
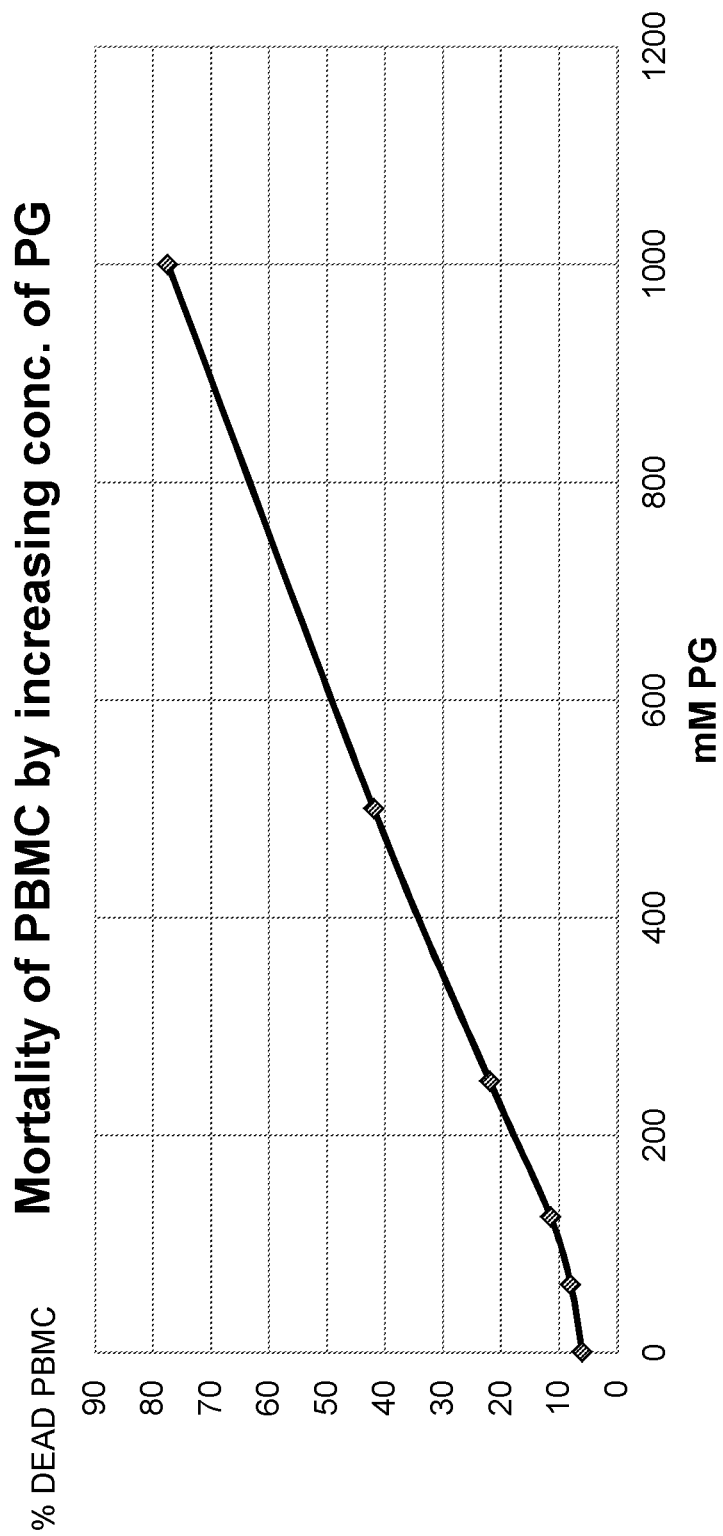
FIG. 7 shows mortality of PBMC at different concentrations of propane-1,2-diol.

As is seen from the results presented FIG. 7, a concentration of propane-1,2-diol up to 1% did not have any significant toxic effect and did not cause any significant cell death of PBMCs as compared to control. A concentration of propane-1,2-diol of 2% had minor or mild toxic effect, whereas higher concentrations of propane-1,2-diol caused significant cell death among the PBMC and was therefore toxic.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for treating the inflammatory condition: recurrent aphthous stomatitis (RAS) in the mucous: membrane of a human subject, the method comprising administering to the human subject a
pharmaceutical composition comprising comprises
from 0.5 to 2% (w/v) of the propane-1,2-diol,
from 90 to 99% (w/v) of poly (acrylic acid) (PAA),
from 7 to 8 (w/w) microcrystalline cellulose,
about 0.1% (w/w) povidone, and
about 0.5% (w/w) magnesium stearate,
wherein the pharmaceutical composition lacks any additional anti-inflammatory agents.

2. The method according to claim 1, wherein the PAA is selected from the group consisting of a PAA having an average viscosity from 29,400 to 39,400 cP at 25° C. of 0.5 wt % aqueous solution at a pHI from 7.3 up to 7.8 , a PAA having an average viscosity from 4,000 to 11,000 cP at 25° C. of a 0.5 wt % aqueous solution at a pHI from 7.3 up to 7.8, and a combination thereof.

3. The method according to claim 1, wherein the pharmaceutical composition is formulated for topical application.

4. The method according to claim 1, wherein the pharmaceutical composition is in a dosage form selected from the group consisting of a patch, a film, a tablet, a cream, an ointment, a gel, a foam and a spray.

5. The method according to claim 4, wherein the dosage form is a mucoadhesive patch.

6. The method according to claim 5, wherein the mucoadhesive patch is selected from the group consisting of a mucoadhesive tablet, a mucoadhesive film and a mucoadhesive gel.

* * * * *